BUTLER & HATFIELD.
Car Starter.
No. 55,464.
2 Sheets—Sheet 1.
Patented June 12, 1866.
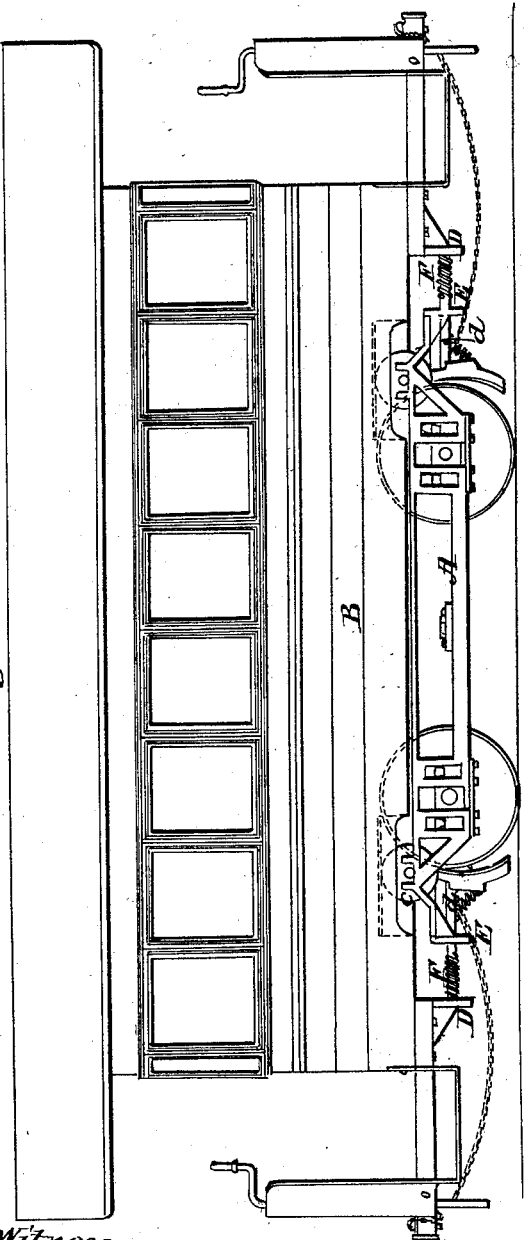
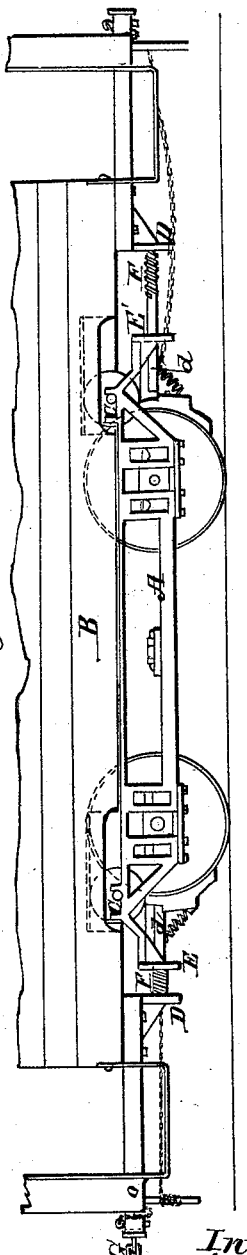

BUTLER & HATFIELD.
Car Starter.
No. 55,464.
2 Sheets—Sheet 2
Patented June 12, 1866.
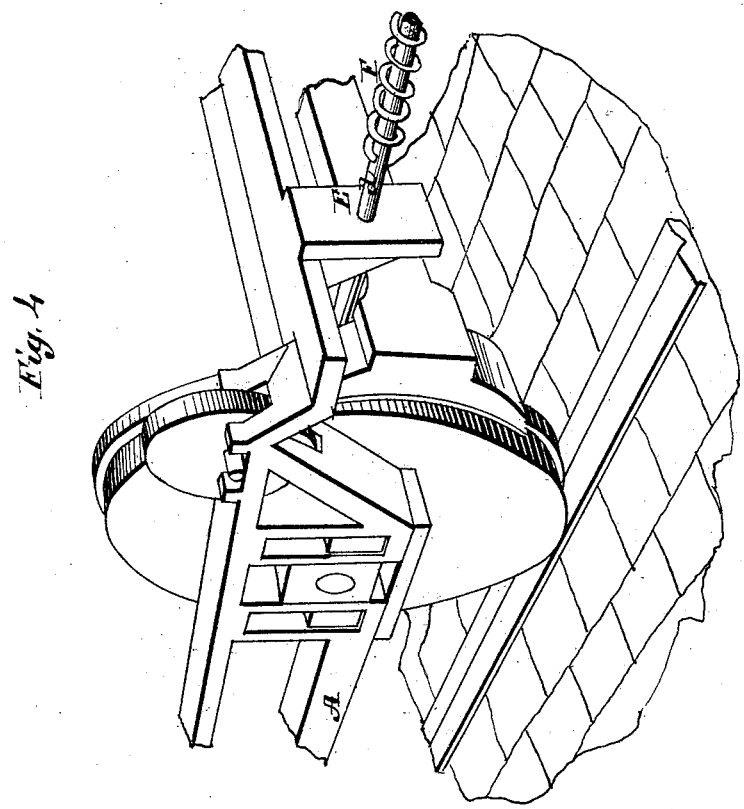
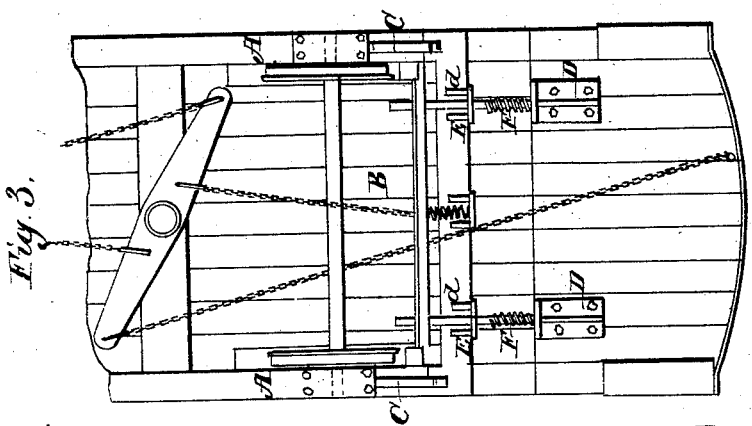
Witnesses:
J. Ware
H. Remer
Inventors:
W. H. Butler
R. G. Hatfield

UNITED STATES PATENT OFFICE.

W. H. BUTLER AND R. G. HATFIELD, OF NEW YORK, N. Y.

IMPROVED MODE OF STARTING CARS.

Specification forming part of Letters Patent No. 55,464, dated June 12, 1866.

*To all whom it may concern:*

Be it known that we, WILLIAM H. BUTLER and ROBERT G. HATFIELD, both of the city of New York, in the county and State of New York, have invented a new and Improved Device for Starting Vehicles; and we do hereby declare that the following is a full and exact description of the same, reference being had to the accompanying drawings, and to the letters of reference marked thereon.

The nature of our invention consists in constructing and arranging the bodies of vehicles loose and portable upon their supporting-trucks in such a manner that a limited movement back and forth may be given to said body upon the frame of the truck, said movement taking place preferably upon rollers, roller-sheaves, wheels, or pulleys, and terminated against springs, and the power being applied to the body of the vehicle instead of to the truck. Very heavy bodies can thus be started with comparative ease.

To enable others skilled in the art to make and use our invention, we will proceed to describe its application to a horse-car and its operation when so applied.

The accompanying drawings form a part of this specification.

Figure 1 is a side elevation. Fig. 2 is the lower part of the same, showing the movement of the body of the car upon the truck. Fig. 3 is a plan of a portion of the bottom of the car, seen from below; and Fig. 4 is a perspective drawing, showing the construction and arrangement at one of the wheels and adjacent parts.

Similar letters of reference indicate like parts in all the drawings.

The drawings show the novel parts with so much of the other parts as is necessary to show their relation thereto. Tints are employed on the duplicate tracing of the original drawings merely to distinguish parts.

We construct a strong frame or truck, A, Fig.1, of iron or other strong material, and place the body B of the car thereupon, resting the same upon small wheels C near each of the main wheels of the truck, as shown. On the bottom of the body of the car we place the brackets D, carrying the guide-bars *d*, and on the frame A of the truck we construct flanges E, through which said guides *d* are inserted, and provide springs F, as shown. The small wheels C are by preference constructed and mounted on the principle of Hatfield's patent roller-sheaves, as indicated.

The operation is as follows: In Fig. 2 the horses are supposed to be hitched to the end G on the left-hand side of the drawings, and the car is at rest. The brakes are set tight upon the main wheels, which operation has set the body of the car back upon the small wheels C. At the starting of the horses the brakes are loosened, and the body of the car is carried forward upon the small wheels C until the spring F' at the rear of the car is brought hard up against the bracket E'. By this time the body of the car has gained some momentum, and as the latter spring tightens against the flange E' the truck is also started with ease.

We propose to apply this principle of starting vehicles not only to horse-cars, but to drays, carts, wagons, steam-cars, and to all instruments of transportation to which its application may prove to be desirable.

Having now described our invention, what we claim as new, and desire to secure by Letters Patent, is as follows:

1. The combination and arrangement of the body of a vehicle loose and portable upon the truck which supports said body, and movable thereupon by means of rollers, roller-sheaves, wheels, pulleys, or their equivalents, substantially as and for the purpose herein described.

2. The combination of the frame A with the guides *d*, springs F, flanges E, small wheels C, and body B, substantially as described, and for the purpose set forth.

W. H. BUTLER. [L. S.]
    R. G. HATFIELD. [L. S.]

Witnesses:
 I. E. WARE,
 I. A. REMER.